(12) United States Patent
Wang

(10) Patent No.: US 12,014,873 B2
(45) Date of Patent: Jun. 18, 2024

(54) RECEIVING CASE AND CHASSIS HAVING THE SAME

(71) Applicant: Wistron Corporation, New Taipei (TW)

(72) Inventor: Jun-Hao Wang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 298 days.

(21) Appl. No.: 17/704,179

(22) Filed: Mar. 25, 2022

(65) Prior Publication Data
US 2023/0230778 A1 Jul. 20, 2023

(30) Foreign Application Priority Data

Jan. 18, 2022 (CN) .......................... 202210053124.0

(51) Int. Cl.
*H01G 11/78* (2013.01)

(52) U.S. Cl.
CPC .................................. *H01G 11/78* (2013.01)

(58) Field of Classification Search
CPC ........ H01G 11/78; H01G 11/82; Y02E 60/10; G06F 1/188; Y10T 292/0814; Y10T 292/0816; Y10T 292/0817; Y10T 292/082; Y10T 292/0876; Y10T 292/0878; Y10T 292/088; Y10T 292/42; Y10T 292/438; Y10S 292/11; Y10S 292/38; E05C 19/06; A47B 88/994; A47C 67/10; B65D 21/086
USPC ...... 312/309, 348.3, 348.1, 205, 330.1, 291, 312/301; 220/4.31, 4.21, 4.01, 4.03, 22.3, 220/22.5; 361/724–732; 206/577, 316, 206/579, 45.18
See application file for complete search history.

(56) References Cited

U.S. PATENT DOCUMENTS

| | | | | |
|---|---|---|---|---|
| 1,212,948 A * | 1/1917 | Hesse | ................. | B65D 21/086 |
| | | | | 220/8 |
| 2,907,487 A * | 10/1959 | Harrington | ............ | A47B 88/90 |
| | | | | 220/8 |
| 3,003,840 A * | 10/1961 | Katzin | ................... | A47B 88/90 |
| | | | | 312/301 |
| 3,140,777 A * | 7/1964 | Gordan | ................. | A45C 11/24 |
| | | | | 220/8 |

(Continued)

FOREIGN PATENT DOCUMENTS

| | | | | |
|---|---|---|---|---|
| CN | 113264264 A * | 8/2021 | .......... | B65D 21/086 |
| WO | WO-9211788 A1 * | 7/1992 | ............ | A47B 88/90 |

*Primary Examiner* — Janet M Wilkens
(74) *Attorney, Agent, or Firm* — McClure, Qualey & Rodack, LLP

(57) ABSTRACT

A chassis includes a receiving case. The receiving case includes a first base, a second base, and a cover. The first base includes two first side walls. One of the two first side walls includes a first sliding portion. One of the two first side walls includes a multi-segment positioning portion. The second base includes two second side walls. One of the two second side walls includes a second sliding portion. One of the two second side walls includes a multi-segment alignment portion. The cover is pivoted on the first base. The first sliding portion is connected to the second sliding portion, and the multi-segment positioning portion of the first base is adapted to be engaged with the multi-segment alignment portion of the second base, so that the second base is slidably disposed on the first base. The receiving case is adapted to accommodate electronic elements.

18 Claims, 15 Drawing Sheets

(56) References Cited

U.S. PATENT DOCUMENTS

| | | | | |
|---|---|---|---|---|
| 3,463,343 | A * | 8/1969 | Asenbauer | B65D 21/0213 |
| | | | | 220/532 |
| 3,831,799 | A * | 8/1974 | Nutt | B65D 7/24 |
| | | | | 220/691 |
| 4,337,861 | A * | 7/1982 | Smart | B65D 21/086 |
| | | | | 220/8 |
| 4,909,406 | A * | 3/1990 | Wu | A45C 11/38 |
| | | | | 220/8 |
| 4,984,798 | A * | 1/1991 | Silberstein | A63F 9/1044 |
| | | | | 40/781 |
| 5,382,009 | A * | 1/1995 | Mertz | A45C 15/00 |
| | | | | 269/302.1 |
| 7,380,894 | B2 * | 6/2008 | Berger | A47B 88/90 |
| | | | | 312/348.3 |
| 8,844,739 | B2 * | 9/2014 | Holey | B65D 81/263 |
| | | | | 229/101 |
| 2021/0171237 | A1 * | 6/2021 | Hsu | B65D 21/086 |

* cited by examiner

RECEIVING CASE AND CHASSIS HAVING THE SAME

CROSS-REFERENCE TO RELATED APPLICATION

This non-provisional application claims priority under 35 U.S.C. § 119(a) to Patent Application No. 202210053124.0 filed in China on Jan. 18, 2022, the entire contents of which are hereby incorporated by reference.

BACKGROUND

Technical Field

The present disclosure relates to a receiving case, and in particular, to a receiving case adapted to be mounted with capacitors and batteries and a chassis having the receiving case.

Related Art

With the development of science and technology and the rapid development of electronic technology applications, a variety of electronic products have been developed, bringing considerable convenience to people's life. The electronic product is, for example, a host or server of an industrial computer, and hosts or servers of different specifications require different electrical power for an operation. Generally, the host or server is configured with different quantities of batteries or capacitors as required. Therefore, it is necessary to design a plurality of receiving cases of different shapes to mount the batteries or capacitors in a chassis, causing unnecessary waste.

In addition, a conventional receiving case includes a plurality of parts for disassembling and assembling a housing of a receiving case and disposing the receiving case in a host or a server, which is inconvenient in operation.

SUMMARY

In view of the above problems, the present disclosure provides a receiving case, including a first base, a second base, and a cover. The first base includes two first side walls disposed in an opposite manner. One of the two first side walls includes a first sliding portion. One of the two first side walls includes a multi-segment positioning portion. The second base includes two second side walls disposed in an opposite manner. One of the two second side walls includes a second sliding portion. One of the two second side walls includes a multi-segment alignment portion. The cover is pivoted on the first base, so that the cover rotates relative to the first base. The first sliding portion is connected to the second sliding portion, and the multi-segment positioning portion of the first base is adapted to be engaged with the multi-segment alignment portion of the second base, so that the second base is slidably disposed on the first base.

According to some embodiments, the first base includes a butting portion, the cover includes an engaging portion, and the butting portion is engaged with the engaging portion, so that the cover rotatably covers the first base.

According to some embodiments, the first base further includes a first bottom wall, opposite two sides of the first bottom wall are respectively connected to the two first side walls, and the first bottom wall includes an abutting portion. The second base further includes a second bottom wall, opposite two sides of the second bottom wall are respectively connected to the two second side walls, and the second bottom wall includes a limiting opening. The abutting portion is adapted to abut against the limiting opening.

According to some embodiments, the engaging portion is an engaging groove, and the butting portion is an engaging protrusion. The cover is pivotally connected to a shaft portion of the first base with a shaft hole.

According to some embodiments, the shaft hole is an elongated hole. The engaging groove includes an insert groove and a guide groove, the insert groove is in combination with the guide groove, the guide groove includes a multi-segment positioning structure with a plurality of fixing positions, and the guide groove is adapted to position the engaging protrusion at one of the plurality of fixing positions.

The present disclosure further provides an embodiment of a chassis, and the chassis includes a housing and a receiving case. The housing includes a bottom plate. The receiving case is disposed on the bottom plate, and the receiving case includes a first base, a second base, and a cover. The first base includes two first side walls disposed in an opposite manner. One of the two first side walls includes a first sliding portion. One of the two first side walls includes a multi-segment positioning portion. The second base includes two second side walls disposed in an opposite manner. One of the two second side walls includes a second sliding portion. One of the two second side walls includes a multi-segment alignment portion. The cover is pivoted on the first base, so that the cover rotates relative to the first base. The first sliding portion is connected to the second sliding portion, and the multi-segment positioning portion of the first base is adapted to be engaged with the multi-segment alignment portion of the second base, so that the second base is slidably disposed on the first base.

According to some embodiments, a positioning protrusion is disposed on the bottom plate. The second base further includes a second bottom wall, opposite two sides of the second bottom wall are respectively connected to the two second side walls, the second bottom wall includes at least one positioning hole, the positioning protrusion is located in the positioning hole, and a height of a top end of the positioning protrusion in a vertical direction is lower than that of a surface of the second bottom wall.

According to some embodiments, the at least one positioning hole sequentially includes an entry portion, a guide portion, and a positioning portion, a width of the guide portion is less than widths of the entry portion and the positioning portion, the positioning protrusion is moved between the entry portion and the positioning portion, and a size of a hole of the entry portion is greater than that of a top of the positioning protrusion.

According to some embodiments, the bottom plate further includes two fixing protrusions respectively located on two sides of the positioning protrusion. The second bottom wall includes two limiting holes corresponding to the two fixing protrusions, the two fixing protrusions are located in the two limiting holes, and a height of a top end of each of the two fixing protrusions in a vertical direction is lower than that of a surface of the second bottom wall.

According to some embodiments, each of the two limiting holes sequentially includes an entrance portion, a shrinking portion, and a fixing portion, a width of the shrinking portion is less than widths of the entrance portion and the fixing portion, the each of the two fixing protrusions is moved between the entrance portion and the fixing portion, and a size of a hole of the entrance portion is greater than that of a head of the fixing protrusion.

A receiving case is provided according to some embodiments. Because of an engagement between the multi-segment positioning portion and the multi-segment alignment portion, the second base is slidably disposed on the first base. Therefore, an accommodating space formed by the first base and the second base has expansion flexibility, and the receiving case may be accommodated with one or more batteries. In some embodiments, among a plurality of batteries accommodated in the receiving case, sizes of the plurality of batteries may be the same or different, which depends on the requirements of an applied electronic device.

According to some embodiments, the cover of the receiving case is pivotally connected to the first base, and a structure of the engaging portion of the cover and the butting portion of the first base is designed, so that a user can easily operate to open and close the cover. According to some embodiments, there is a plurality of batteries in the receiving case, the engaging portion of the cover is an engaging groove, the engaging groove includes an insert groove and a guide groove, the multi-segment positioning structure of the guide groove includes a plurality of fixing positions, and the shaft hole is of a long and narrow shape. In this way, the user can adjust a position of the cover and position the protrusion at one of the plurality of fixing positions, so that the cover covers batteries on the second base. In addition to protecting a battery located on the first base, the cover further protects a battery located on the second base.

According to some embodiments, in the chassis, because the bottom plate of the housing includes the positioning protrusion and the fixing protrusions, and the second base includes the positioning hole and the limiting holes, it is easier to remove the receiving case from and mount the receiving case on the bottom plate of the housing.

DETAILED DESCRIPTION

Figure 1:
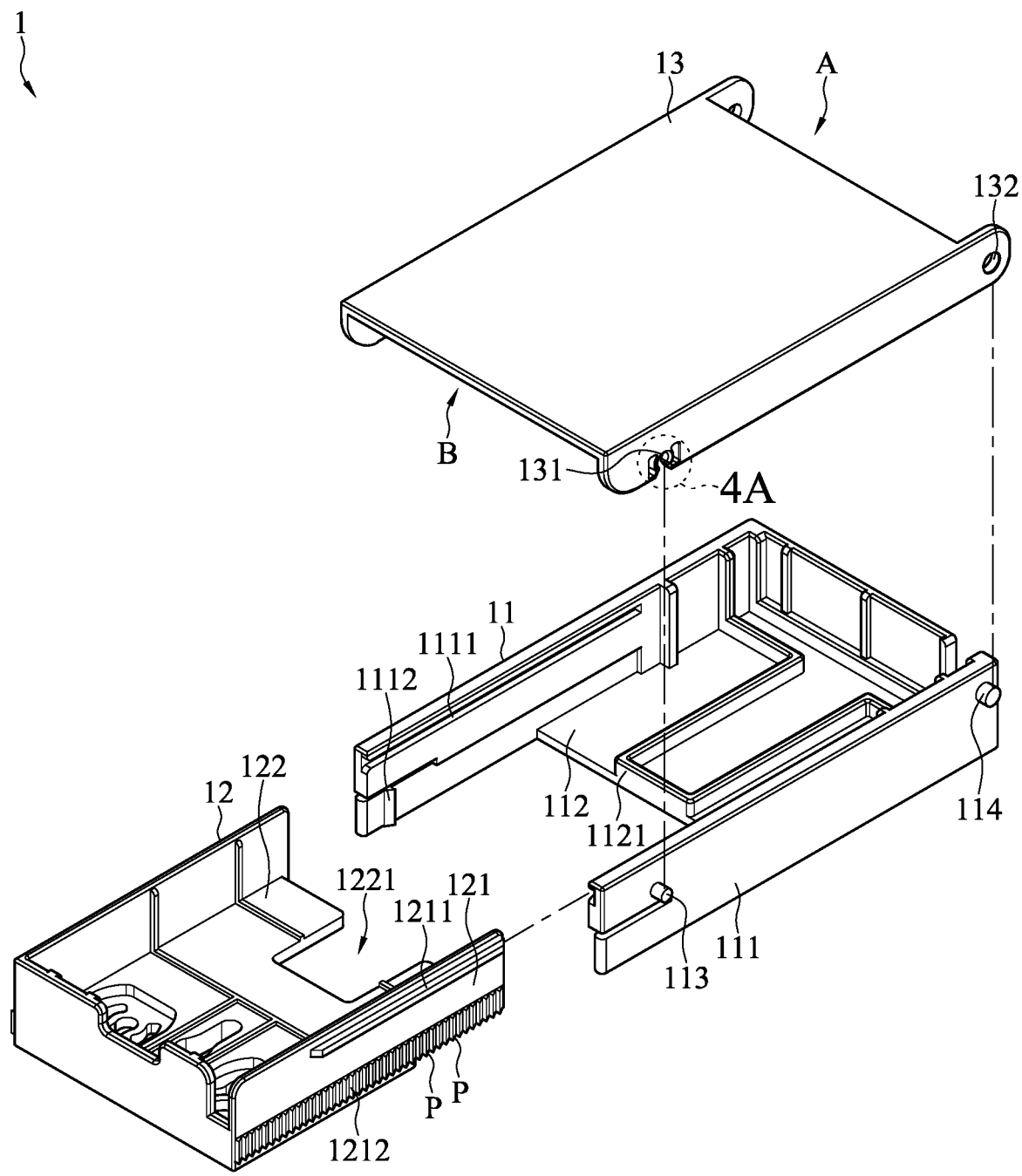
FIG. 1 illustrates a schematic exploded view of a receiving case according to an embodiment of the present disclosure.
Figure 2A:
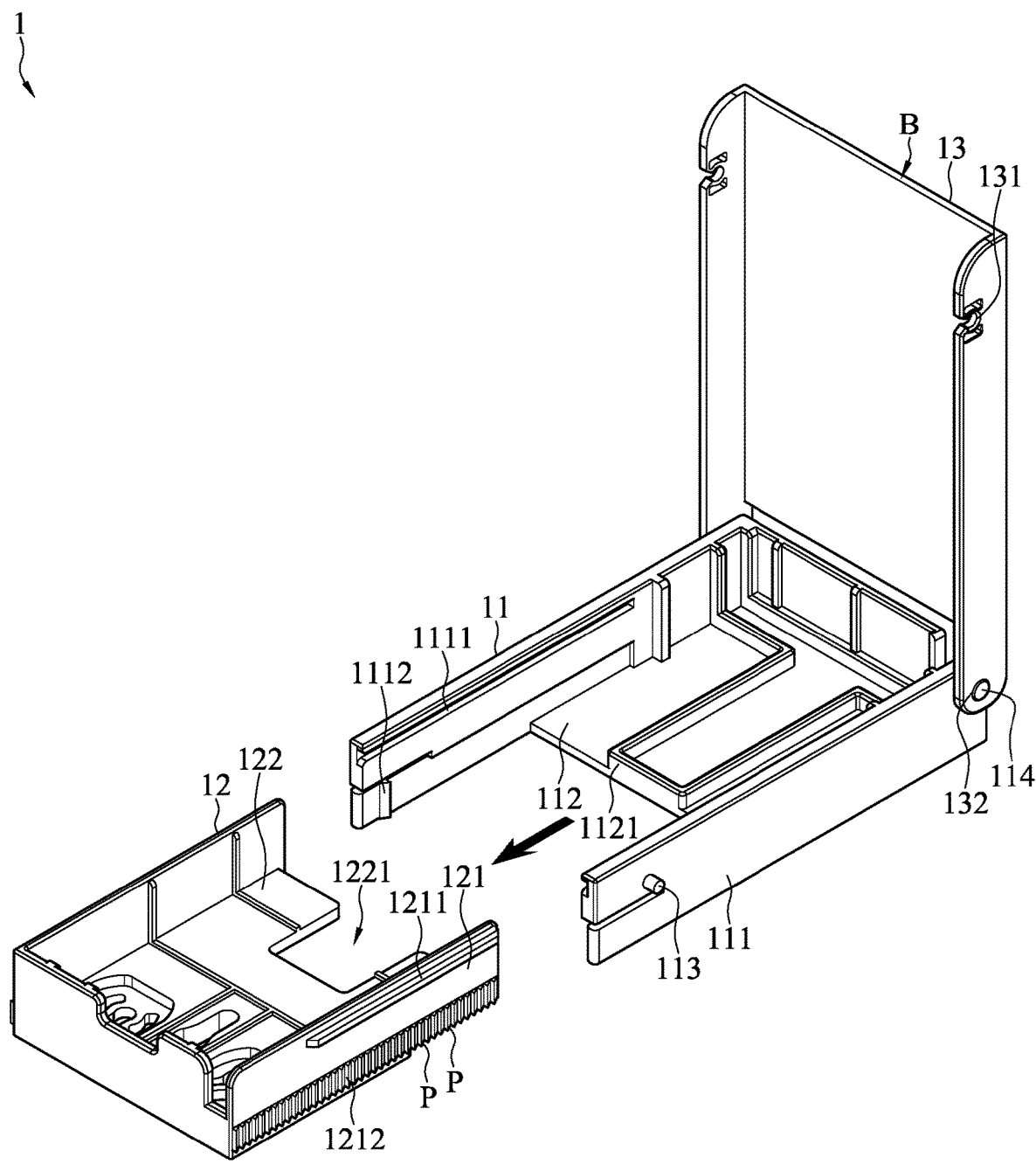
FIG. 2A to FIG. 2C respectively illustrate schematic diagrams of an engagement between a first base and a second base according to an embodiment of the present disclosure.
Figure 2B:
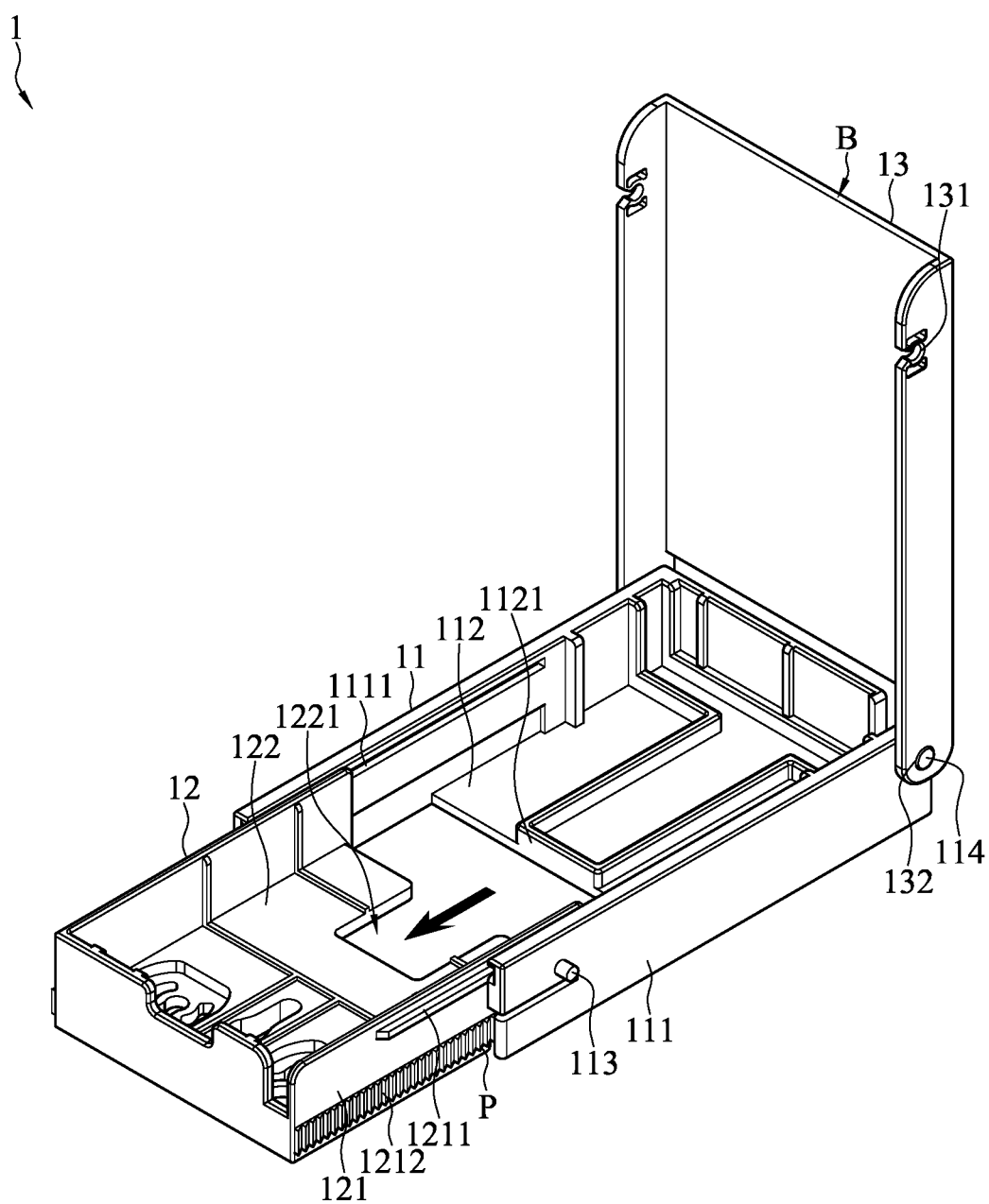
Figure 2C:
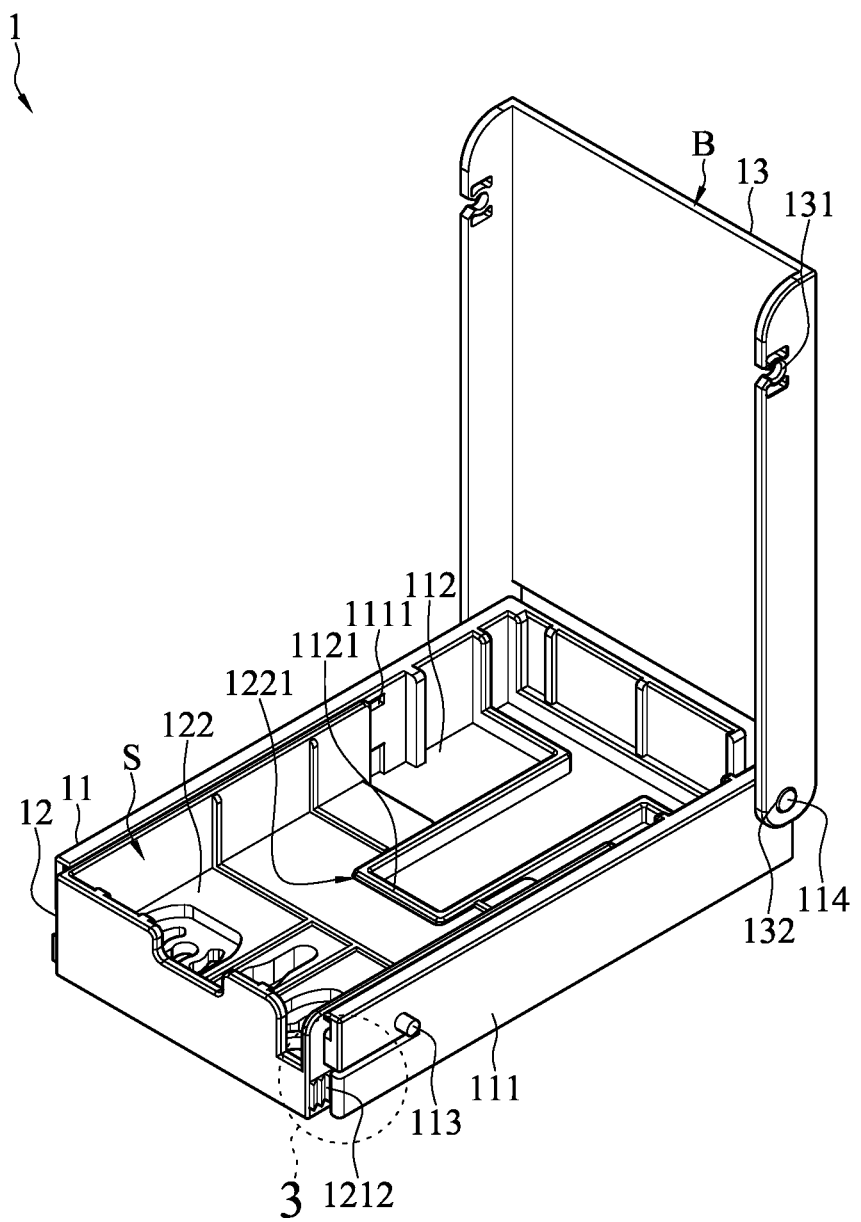
Figure 3:
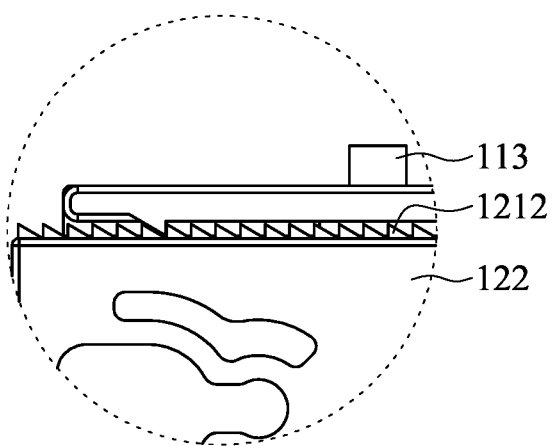
FIG. 3 illustrates a partial schematic view of an embodiment shown in FIG. 2C from a top view.

Referring to FIG. 1, FIG. 2A to FIG. 2C, and FIG. 3, FIG. 1 illustrates a schematic exploded view of a receiving case 1 according to an embodiment of the present disclosure. FIG. 2A to FIG. 2C respectively illustrate schematic diagrams of an engagement between a first base 11 and a second base 12 according to an embodiment of the present disclosure. FIG. 3 illustrates a partial schematic view of an embodiment shown in FIG. 2C from a top view. The receiving case 1 includes the first base 11, the second base 12, and a cover 13. The second base 12 is connected to the first base 11, and the cover 13 removably covers the first base 11 and the second base 12. An accommodating space S formed by the first base 11, the second base 12, and the cover 13 is adapted to be mounted with one or more electronic elements 3.

In some embodiments, the first base 11 includes two first side walls 111, and one of the two first side walls 111 includes a first sliding portion 1111 and a multi-segment positioning portion 1112. The first sliding portion 1111 and the multi-segment positioning portion 1112 may be located on the same or different first side walls 111. According to an embodiment shown in FIG. 1, the first base 11 includes two first sliding portions 1111 and two multi-segment positioning portions 1112, and the two first sliding portions 1111 and the two multi-segment positioning portions 1112 are located on the two first side walls 111 respectively. In some embodiments, the second base 12 includes two second side walls 121, and one of the two second side walls 121 includes a second sliding portion 1211 and a multi-segment alignment portion 1212. The multi-segment alignment portion 1212 cooperates with the multi-segment positioning portion 1112, and the second sliding portion 1211 cooperates with the first sliding portion 1111. In some embodiments, the cover 13 is rotatably connected to the first base 11, the cover 13 includes a first end A and an opposite second end B, the first end A is pivoted on the first base 11, and the second end B includes an engaging portion 131 engaged with a butting portion 113 of the first base 11.

In some embodiments, the first sliding portion 1111 of the first base 11 is connected to the second sliding portion 1211 of the second base 12, so that the first base 11 and the second base 12 are relatively slidable. The multi-segment positioning portion 1112 of the first base 11 cooperates with the multi-segment alignment portion 1212 of the second base 12, so that the second base 12 includes a plurality of positioning positions P relative to the first base 11, and is fixed at one of the plurality of positioning positions P. That is to say, the multi-segment positioning portion 1112 and the multi-segment alignment portion 1212 can move relative to each other, a plurality of positioning positions P is formed therebetween, and the multi-segment positioning portion 1112 and the multi-segment alignment portion 1212 are fixed at one of the plurality of positioning positions P. In some embodiments, there is a mounting state between the multi-segment positioning portion 1112 and the multi-segment alignment portion 1212, that is, a state in which the multi-segment positioning portion 1112 and the multi-segment alignment portion 1212 relatively move and are fixed at a positioning position P, so that the first base 11 and the second base 12 are engaged. There is also a separated state between the multi-segment positioning portion 1112 and the multi-segment alignment portion 1212, that is, a state in which the multi-segment positioning portion 1112 and the multi-segment alignment portion 1212 are separated, so that the second base 12 can move relative to the first base 11.

According to an embodiment shown in FIG. 1, the first sliding portion 1111 is a sliding groove, and the second sliding portion 1211 is a slide rail. In some embodiments, the first sliding portion 1111 is a slide rail, and the second sliding portion 1211 is a sliding groove. The sliding groove and the slide rail can be engaged with each other, and make the first base 11 and the second base 12 be approached to and separated from each other. According to an embodiment shown in FIG. 2A to FIG. 2C, the multi-segment positioning portion 1112 is a rack, the multi-segment alignment portion 1212 is a fixer, there is a plurality of positioning positions P on the rack, and the fixer can be moved on the rack and positioned at one of the plurality of positioning positions P. In some embodiments, the rack of the multi-segment positioning portion 1112 is directional teeth, limiting a movement of the multi-segment alignment portion 1212 in a fixed direction. As described above, according to a design of the user, the fixer may be positioned on the rack in a mounting state, or may be separated from the rack in a separated state. According to an embodiment shown in FIG. 3, if the user wants to separate the multi-segment positioning portion 1112 and the multi-segment alignment portion 1212, it is required that a force is applied to the first side wall 111 to expand the first side wall 111 to the outside, so that the multi-segment positioning portion 1112 and the multi-segment alignment portion 1212 are separated, and the first base 11 and the second base 12 are in a separated state. In some embodiments, the multi-segment positioning portion 1112 is a fixer, and the multi-segment alignment portion 1212 is a rack, which can also produce the above positioning effect.

According to an embodiment shown in FIG. 1, the first base 11 further includes a first bottom wall 112, opposite two sides of the first bottom wall 112 are respectively connected to the two first side walls 111, and the first bottom wall 112 includes an abutting portion 1121. The second base 12 further includes a second bottom wall 122, opposite two sides of the second bottom wall 122 are respectively connected to the two second side walls 121, and the second bottom wall 122 includes a limiting opening 1221. The abutting portion 1121 is configured to abut against the limiting opening 1221. The user can plan an accommodating space S in which batteries or capacitors can be accommodated in the first base 11 and the second base 12 by designing the abutting portion 1121 of the first base 11 and the limiting opening 1221 of the second base 12 (referring to FIG. 2C). The electronic elements 3, which are batteries and are accommodated in the receiving case 1 below are used as an example, but the present disclosure is not limited thereto. According to some embodiments, the electronic elements 3 may be supercaps.

Figure 4A:
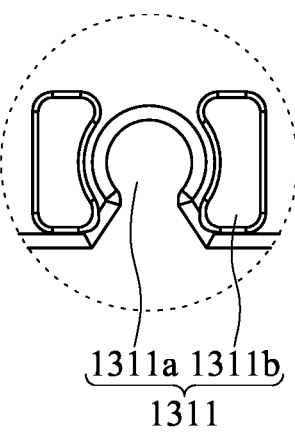
FIG. 4A illustrates a schematic diagram of an engaging portion of a cover of an embodiment shown in FIG. 1.
Figure 4B:
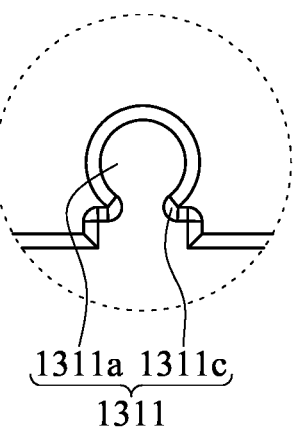
FIG. 4B illustrates a schematic diagram of an engaging portion of a cover according to an embodiment of the present disclosure.
Figure 4C:
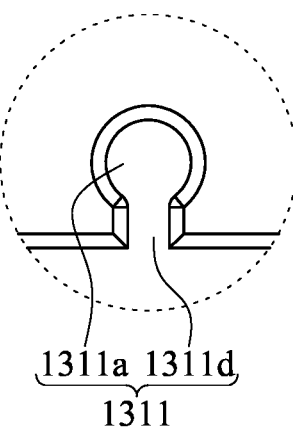
FIG. 4C illustrates a schematic diagram of an engaging portion of a cover according to an embodiment of the present disclosure.

Further referring to FIG. 1, and FIG. 4A to FIG. 4C, FIG. 4A illustrates a schematic diagram of an engaging portion 131 of a cover 13 of an embodiment shown in FIG. 1. FIG. 4B illustrates a schematic diagram of an engaging portion 131 of a cover 13 according to an embodiment of the present disclosure. FIG. 4C illustrates a schematic diagram of an engaging portion 131 of a cover 13 according to an embodiment of the present disclosure. According to an embodiment shown in FIG. 1, the engaging portion 131 is an engaging groove 1311, and the butting portion 113 of the first base 11 is an engaging protrusion 113. The first end A of the cover 13 includes a shaft hole 132, the first base 11 includes a shaft portion 114 corresponding to the shaft hole 132, and the shaft portion 114 is inserted into the shaft hole 132. Thereby, the cover 13 rotatably covers the first base 11 and the second base 12 in a pivoting manner. As shown in FIG. 4A, the engaging groove 1311 is an elastic engaging groove, the engaging groove 1311 includes an engagement groove 1311a and two openings 1311b, and the two openings 1311b are located on two sides of the engagement groove 1311a. With such a structure, the engaging groove 1311 can be elastically engaged with the engaging protrusion 113. According to an embodiment shown in FIG. 4B, the engaging groove 1311 includes an engagement groove 1311a and a constricting portion 1311c, and the engaging protrusion 113 is fixed in the engagement groove 1311a through the constricting portion 1311c. According to an embodiment shown in FIG. 4C, the engaging groove 1311 includes an engagement groove 1311a and an entry path 1311d, and the engaging protrusion 113 is fixed in the engagement groove 1311a through the entry path 1311d. In some embodiments, a distance between two side walls of the entry path 1311d is slightly less than an outer diameter of the engaging protrusion 113.

FIG. 5A to FIG. 5D respectively illustrate schematic diagrams of using a receiving case 1 according to an embodiment of the present disclosure. According to the embodiments, because the multi-segment positioning portion 1112 of the receiving case 1 can be fixed at one of the plurality of positioning positions P of the multi-segment alignment portion 1212, in this way, an accommodating space S of the first base 11 and the second base 12 for accommodating the electronic elements 3 may have a variety of changes. The receiving case 1 may accommodate electronic elements 3 or 4, and dimensions thereof are lengths along mounting and separated directions. According to an embodiment shown in FIG. 5A to FIG. 5D, the receiving case 1 is accommodated with a single electronic element 3.

Figure 5A:
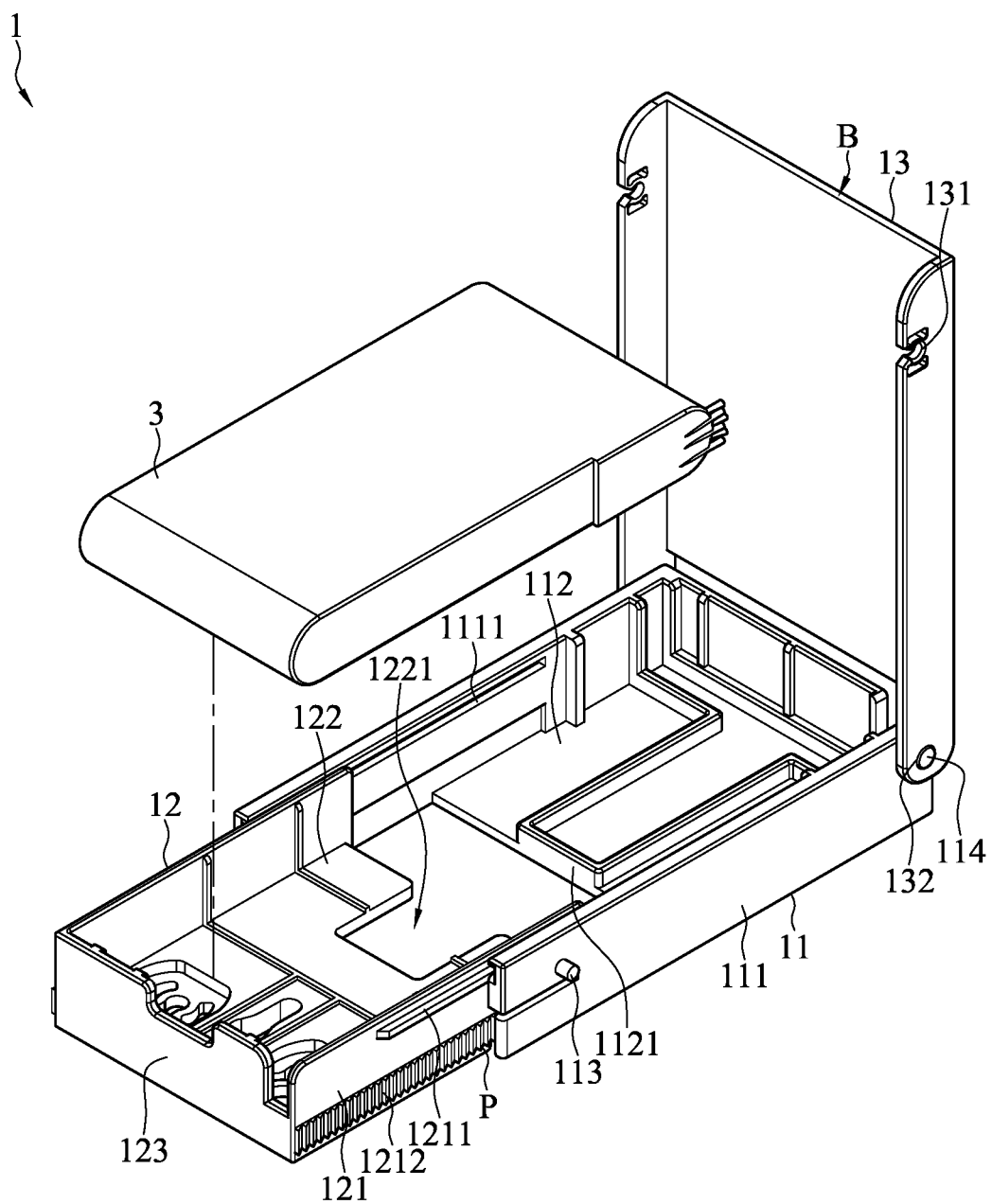
FIG. 5A to FIG. 5D respectively illustrate schematic diagrams of using a receiving case according to an embodiment of the present disclosure.
Figure 5B:
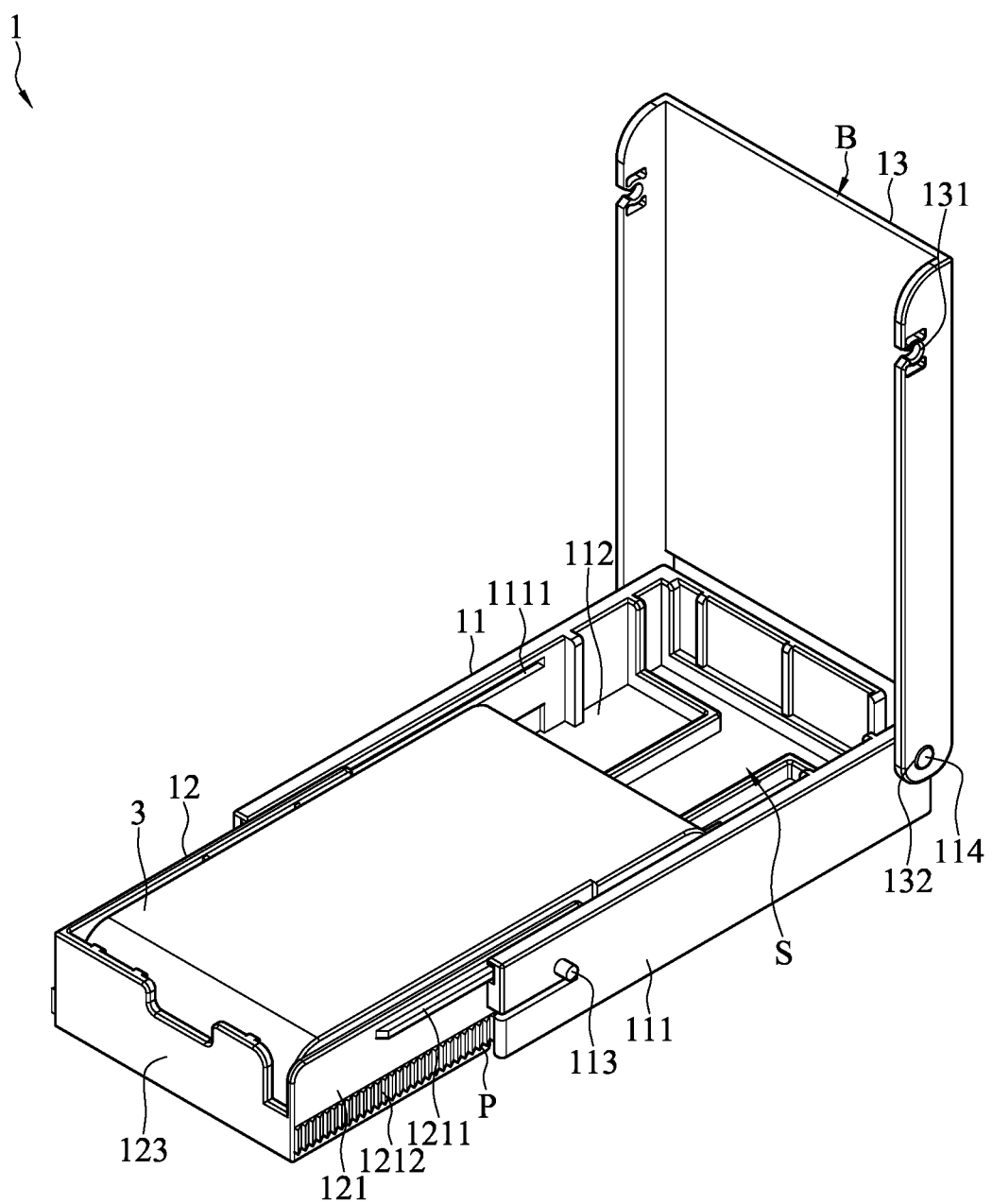
Figure 5C:
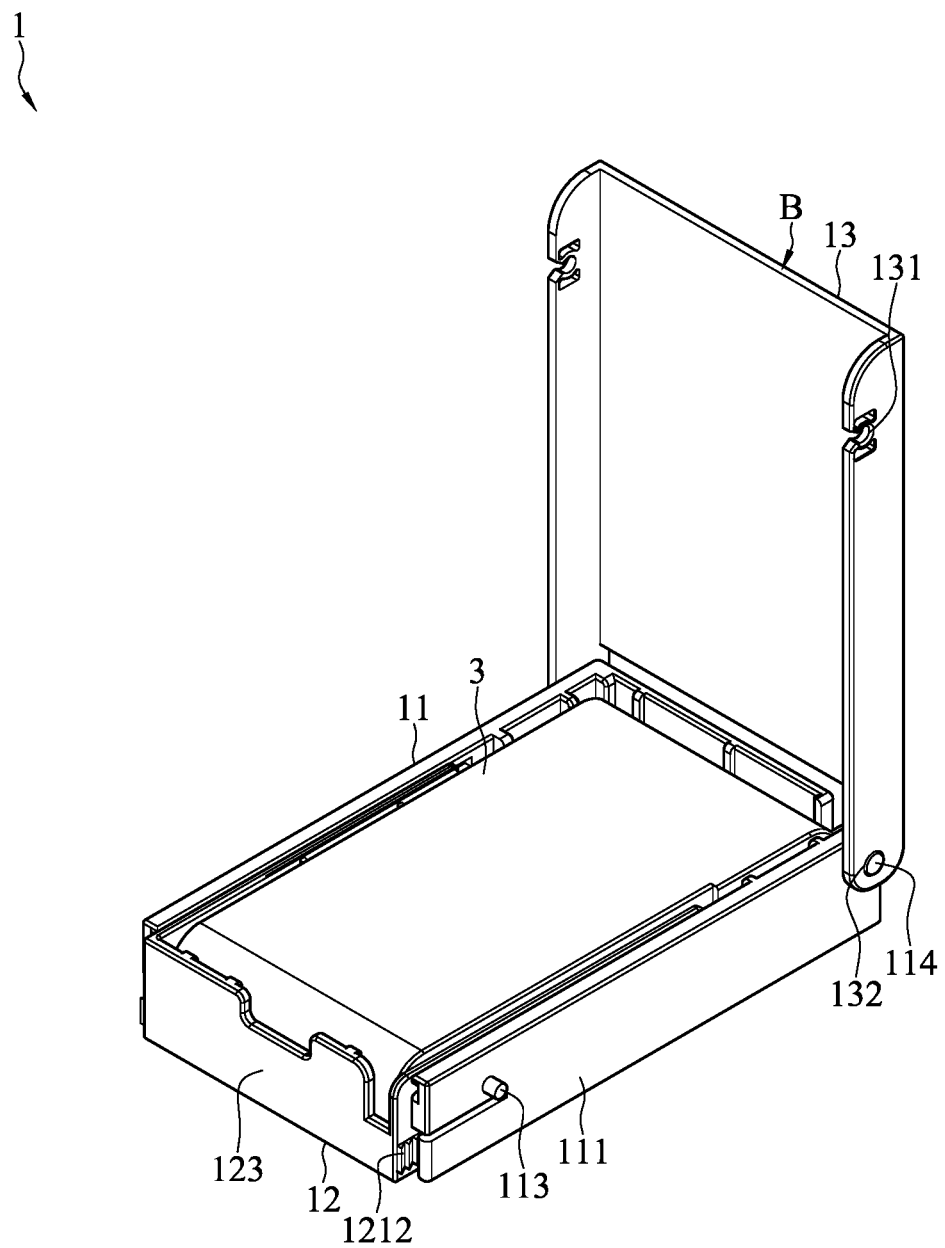
Figure 5D:
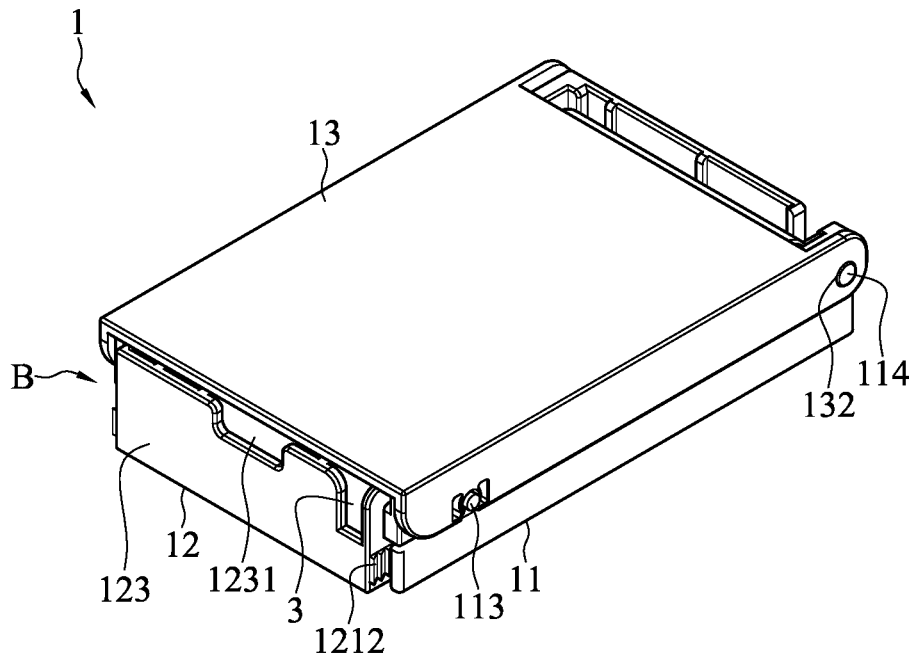

As shown in FIG. 5D, in this embodiment, the second base 12 further includes a baffle 123 connected to one end of the second bottom wall 122, and two ends of the baffle 123 are respectively connected to the two second side walls 121. The baffle 123 includes a groove 1231, and the groove 1231 corresponds to the second end B of the cover 13. The groove 1231 provides a space for the user to lift and toggle the second end B of the cover 13, so that the cover 13 pivots with the first end A and rotates away from the first base 11 (referring to FIG. 5C).

Figure 6:
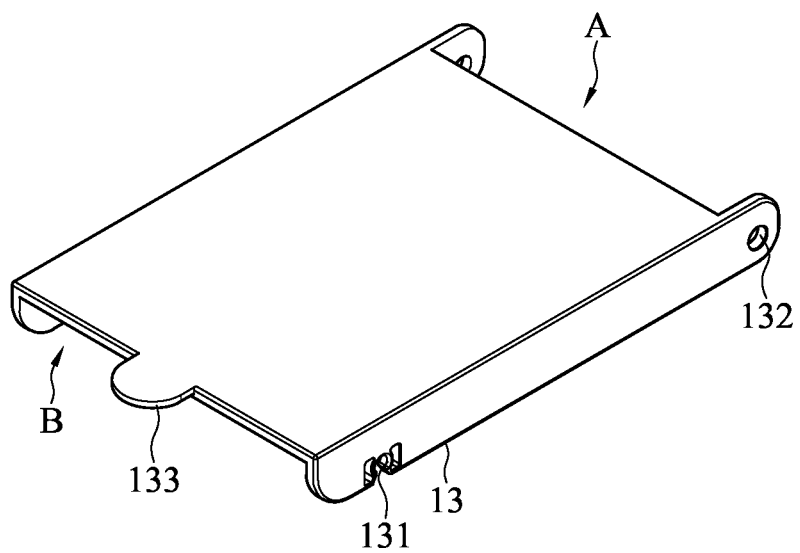
FIG. 6 illustrates a schematic diagram of an appearance of a cover according to an embodiment of the present disclosure.

FIG. 6 illustrates a schematic diagram of an appearance of a cover 13 according to an embodiment of the present disclosure. According to this embodiment, the cover 13 may further include a grip portion 133, and the grip portion 133 is pulled by the user, so that the second end B of the cover 13 rotates away from the first base 11 with the first end A as an axis of rotation. With such a structural design, it is convenient for the user to open the cover 13.

Figure 7A:
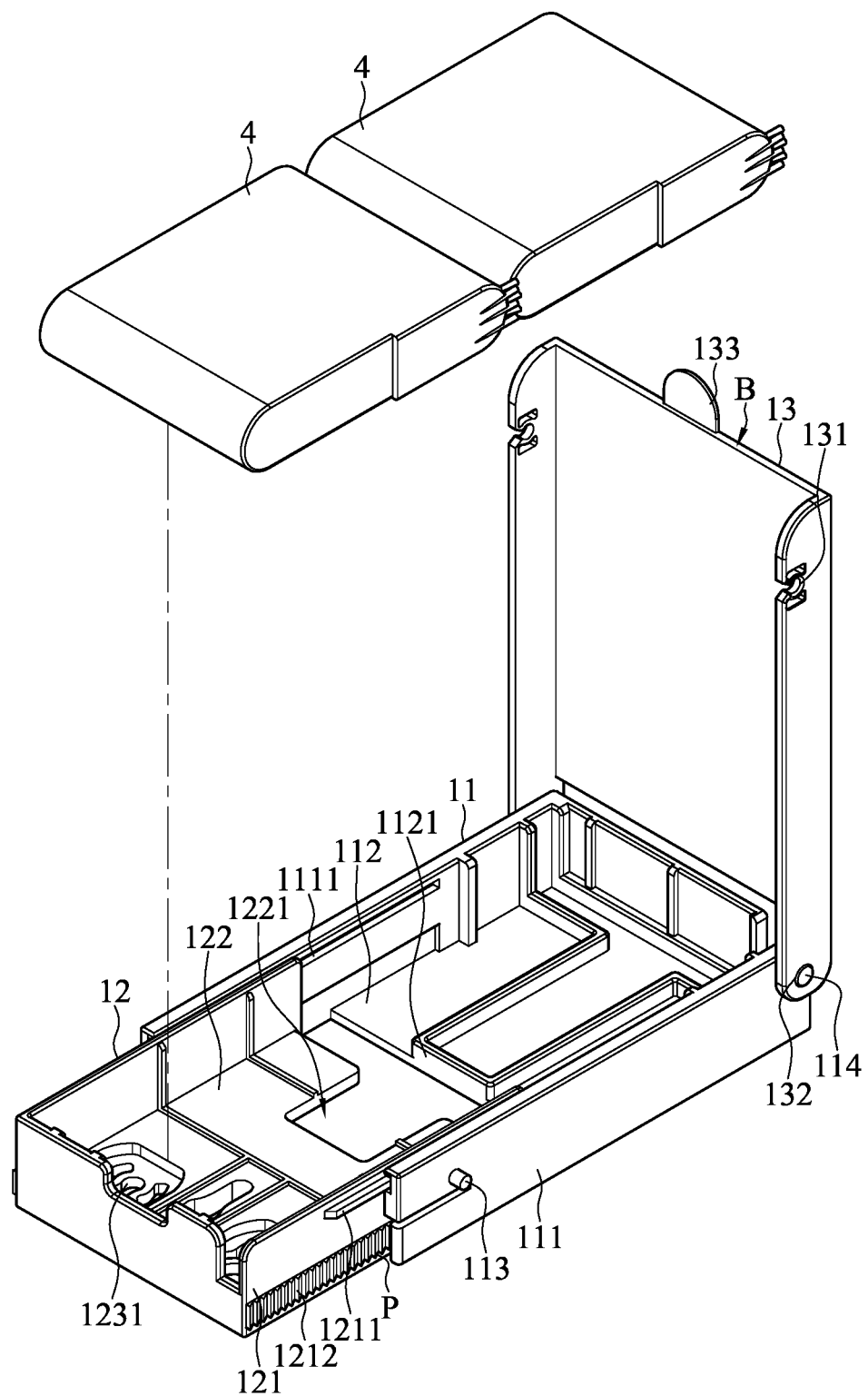
FIG. 7A to FIG. 7C respectively illustrate schematic diagrams of using a receiving case according to an embodiment of the present disclosure.
Figure 7B:
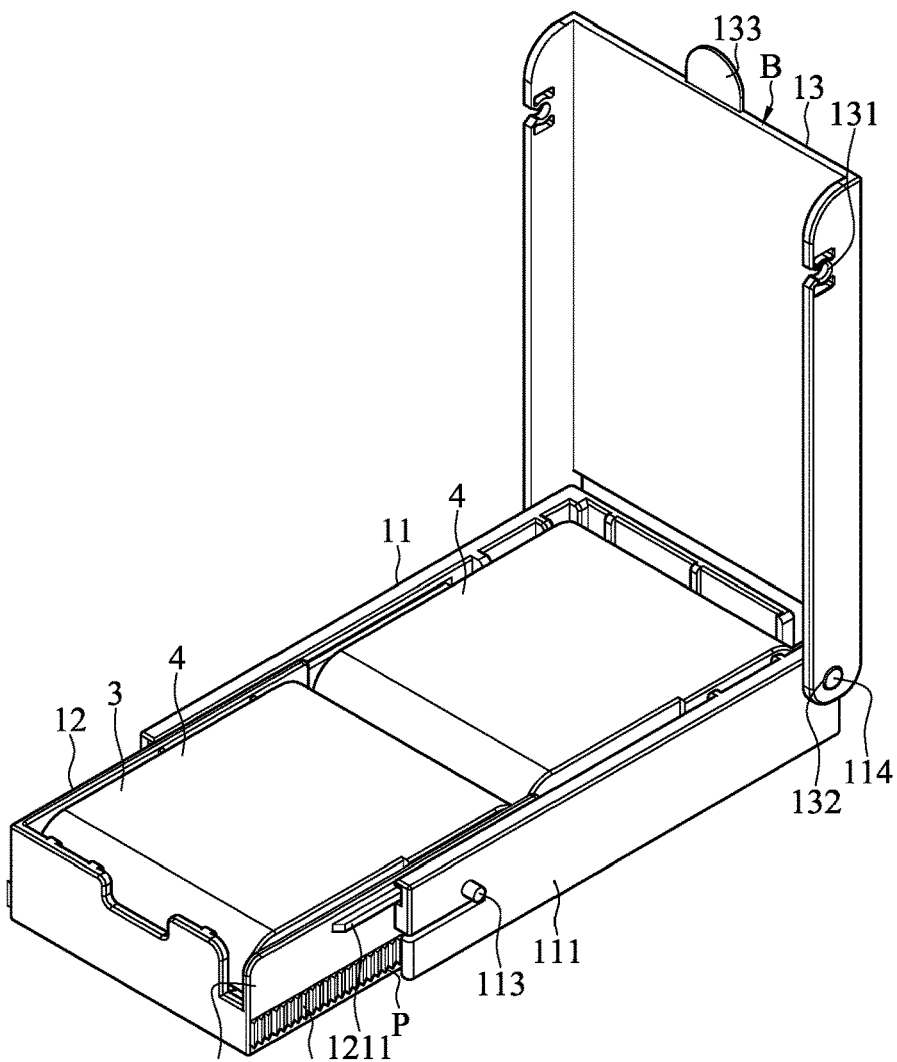
Figure 7C:
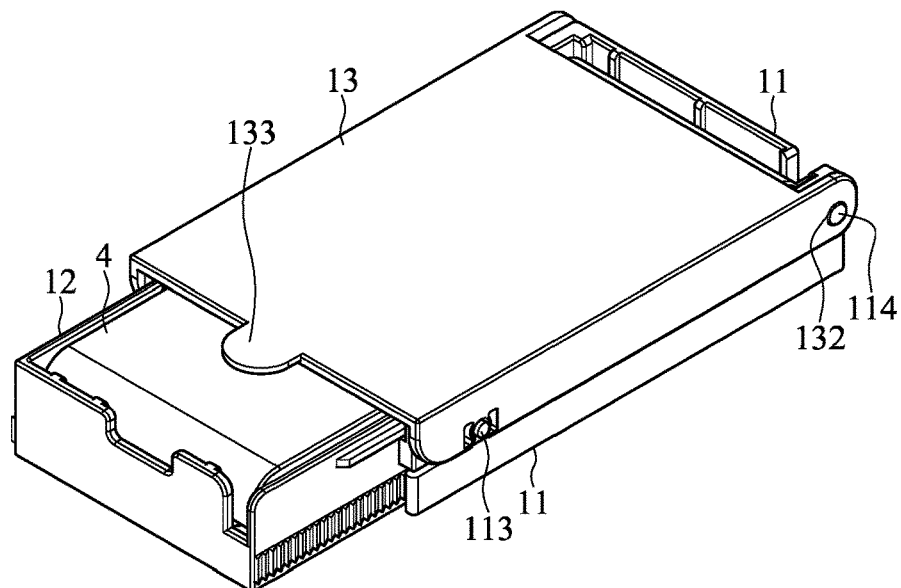

FIG. 7A to FIG. 7C respectively illustrate schematic diagrams of using a receiving case 1 according to an embodiment of the present disclosure. According to the embodiments, the receiving case 1 is accommodated with two electronic elements 4. In some embodiments, the receiving case 1 is accommodated with two or more electronic elements 3 or two or more electronic elements 4. According to some embodiments, the receiving case 1 includes electronic elements 3 and electronic elements 4. Dimensions of the electronic elements 3 and the electronic elements 4 are different. More specifically, widths and thicknesses of the electronic elements 3 and the electronic elements 4 are the same, but lengths thereof are different. In this way, the user may flexibly choose to place a plurality of electronic elements 3 and electronic elements 4 in the receiving case 1. However, the present disclosure is not limited thereto, and different plans and configurations are required depending on the requirements of an applied host or server.

Figure 8A:
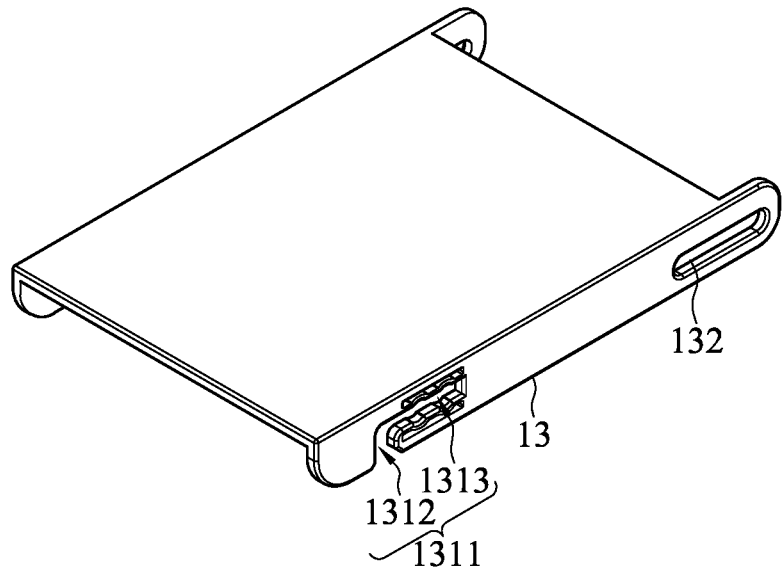
FIG. 8A illustrates a schematic diagram of an appearance of a cover according to an embodiment of the present disclosure.
Figure 8B:
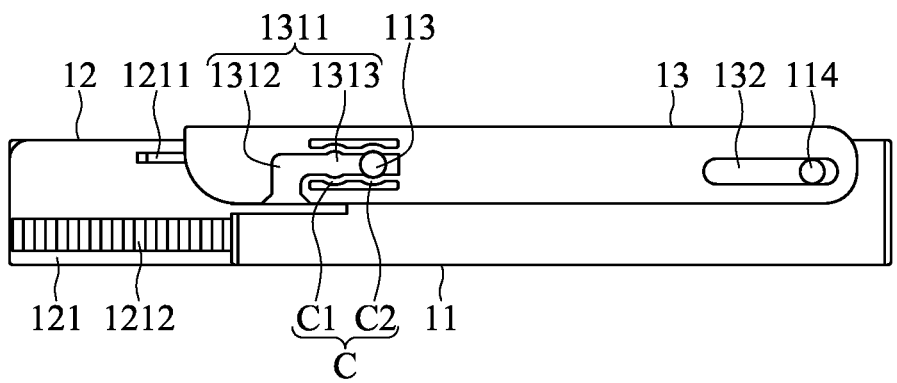
FIG. 8B illustrates a schematic diagram of using a receiving case according to an embodiment of the present disclosure.
Figure 8C:
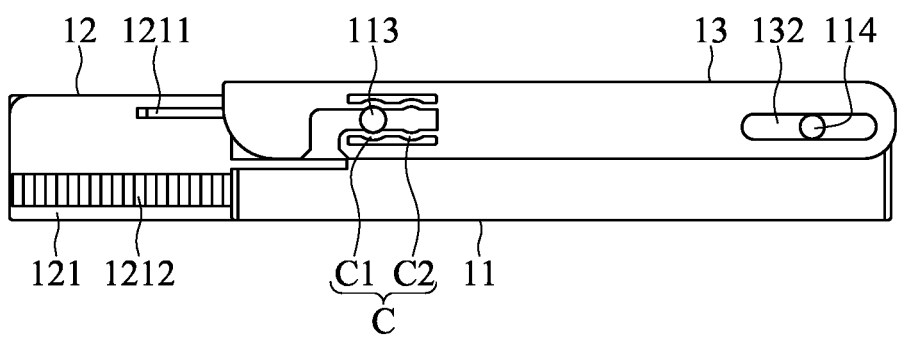
FIG. 8C illustrates a schematic diagram of using a receiving case according to an embodiment of the present disclosure.
Figure 8D:
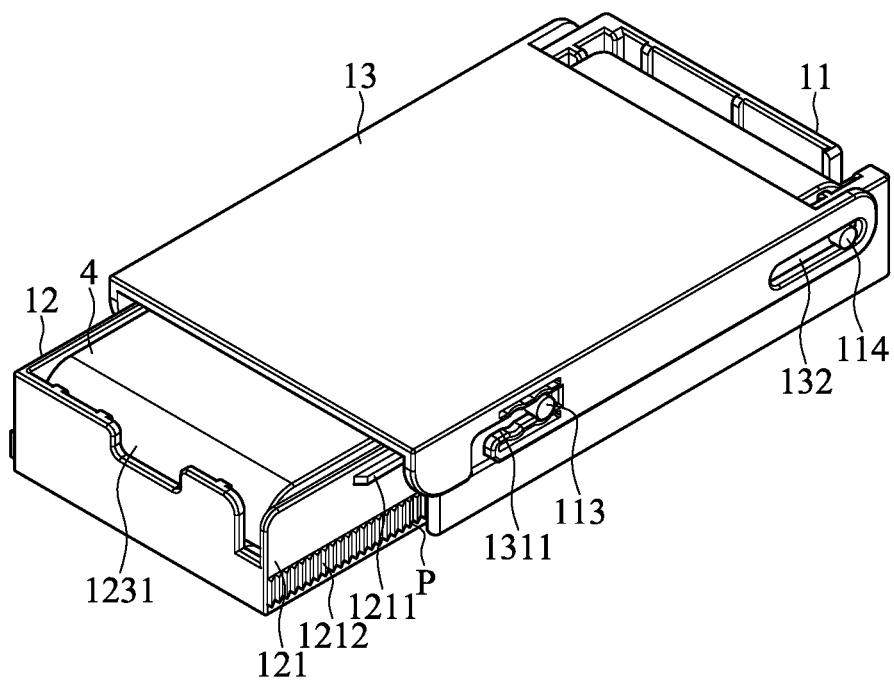
FIG. 8D illustrates a schematic diagram of an appearance of a receiving case according to an embodiment of the present disclosure.

Referring to FIG. 8A to FIG. 8D, FIG. 8A illustrates a schematic diagram of an appearance of a cover 13 according to an embodiment of the present disclosure. FIG. 8B and FIG. 8C respectively illustrate schematic diagrams of using a receiving case 1 according to an embodiment of the present disclosure. FIG. 8D illustrates a schematic diagram of an appearance of a receiving case 1 according to an embodiment of the present disclosure. The cover 13 shown in FIG. 8B to FIG. 8D is the cover 13 of FIG. 8A. As shown in FIG. 8A, the shaft hole 132 of the cover 13 is an elongated hole, and the shaft portion 114 of the first base 11 can slide in the shaft hole 132. The engaging groove 1311 includes an insert groove 1312 and a guide groove 1313. The insert groove 1312 is in communication with the guide groove 1313. The guide groove 1313 includes a multi-segment positioning structure configured to position the engaging protrusion 113 to have a plurality of fixing positions C. As shown in FIG. 8B and FIG. 8C, in some embodiments, the guide groove 1313 includes two fixing positions C1 and C2. Through an adjustment of the user, the cover 13 is moved, so that the butting portion 113 is positioned at the fixing position C1 or the fixing position C2. With such a structural design, when the receiving case 1 is accommodated with a plurality of electronic elements 3, a plurality of electronic elements 4, or a plurality of electronic elements 3 and electronic elements 4, the user can adjust the cover 13, so that the cover 13 covers the electronic elements 3 or the electronic elements 4 on an upper part of the second base 12 to protect the electronic elements located in the accommodating space S, as shown in FIG. 8D.

Figure 9:
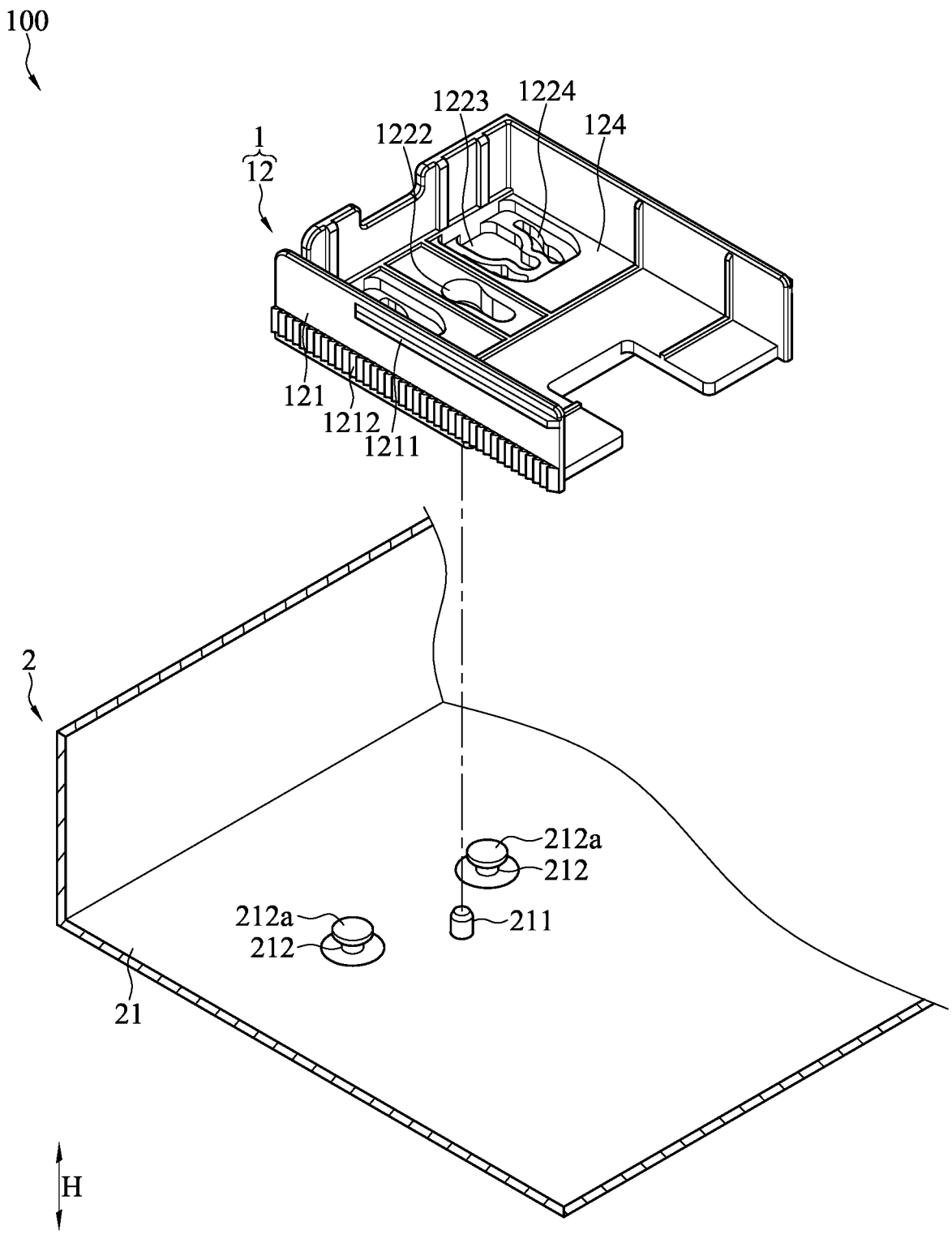
FIG. 9 illustrates a partial schematic view of a chassis according to an embodiment of the present disclosure.
Figure 10A:
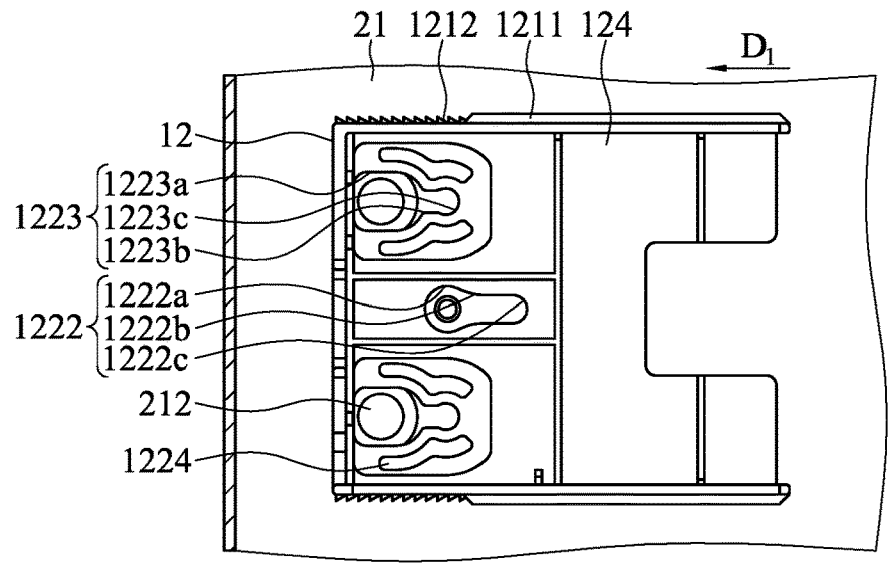
FIG. 10A and FIG. 10B respectively illustrate schematic diagrams of mounting a receiving case in a housing according to an embodiment of the present disclosure, and a cover and a first base are omitted.
Figure 10B:
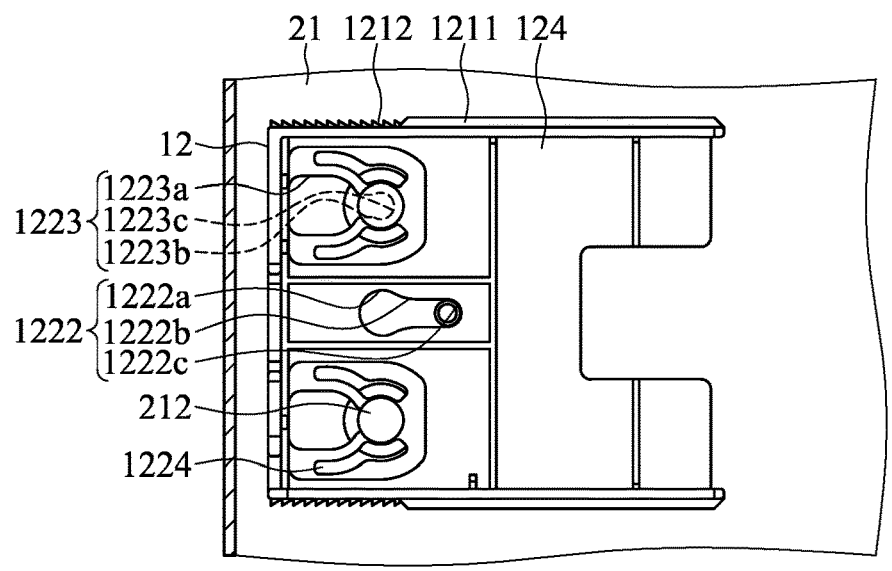

Referring to FIG. 9 to FIG. 10B, FIG. 9 illustrates a partial schematic view of a chassis 100 according to an embodiment of the present disclosure. FIG. 10A and FIG. 10B respectively illustrate schematic diagrams of mounting a receiving case 1 in a housing 2 according to an embodiment of the present disclosure, and a cover 13 and a first base 11 are omitted. A chassis 100 includes a housing 2 and a receiving case 1. The housing 2 includes a bottom plate 21, and the receiving case 1 is removably mounted on the bottom plate 21. In order to clearly describe a relationship between the second base 12 of the receiving case 1 and the bottom plate 21 of the housing 2, the cover 13 and the first base 11 are omitted in FIG. 9 to FIG. 10B.

According to an embodiment shown in FIG. 9, a positioning protrusion 211 is disposed on the bottom plate 21, and the bottom plate 21 may be any plate in the housing 2, which is not limited in the present disclosure. The second bottom wall 122 of the receiving case 1 includes a positioning hole 1222 corresponding to the positioning protrusion 211. According to the embodiments, the positioning hole 1222 sequentially includes an entry portion 1222a, a guide portion 1222b, and a positioning portion 1222c. In some embodiments, a width of the guide portion 1222b is approximately equal to a width of the positioning protrusion, and a size of a hole of the entry portion 1222a is greater than that of a top of the positioning protrusion 211, so that the positioning portion 1222c can be easily inserted into the entry portion 1222a. When the user wants to dispose the receiving case 1 on the bottom plate 21, the positioning protrusion 211 is inserted into the entry portion 1222a of the positioning hole 1222, and the user moves the receiving case 1 in a mounting direction D1, so that the positioning protrusion 211 is moved from the entry portion 1222a of the second bottom wall 122 of the second base 12 to the positioning portion 1222c, and the receiving case 1 is positioned on the bottom plate 21 without an external force. When the user wants to separate the receiving case 1 from the bottom plate 21, the user moves the receiving case 1 in a direction opposite to the mounting direction D1, so that the positioning protrusion 211 is moved from the positioning portion 1222c to the entry portion 1222a, and the receiving case 1 and the bottom plate 21 are in a separated state (referring to FIG. 10A and FIG. 10B).

According to some embodiments, when the receiving case 1 is mounted in the chassis 100, a height of a top end of the positioning protrusion 211 in a vertical direction His lower than that of a surface 124 of the second bottom wall 122. With such a structure, the user may mount the receiving case 1 on or remove the receiving case 1 from the bottom plate 21 without affecting or damaging batteries on the second base 12.

According to an embodiment shown in FIG. 9 to FIG. 10B, the bottom plate 21 further includes a fixing protrusion 212 adjacent to the positioning protrusion 211. In some embodiments, the bottom plate 21 includes two fixing protrusions 212 respectively located on two sides of the positioning protrusion 211. The second bottom wall 122 includes a limiting hole 1223 corresponding to the fixing protrusion 212. The limiting hole 1223 sequentially includes an entrance portion 1223a, a shrinking portion 1223b, and a fixing portion 1223c. A width of the shrinking portion 1223b is less than widths of the entrance portion 1223a and the fixing portion 1223c. The shrinking portion 1223b causes a "shrinking" effect between the entrance portion 1223a and the fixing portion 1223c, so that the fixing protrusion 212 positioned in the fixing portion 1223c cannot easily be moved to the entrance portion 1223a. In this embodiment, two sides of the limiting hole 1223 include assisted openings 1224, so that the limiting hole 1223 has elasticity to fix the fixing protrusion 212. A size of a hole of the entrance portion 1223a is greater than that of a head of the fixing protrusion 212, so that the fixing protrusion 212 can be easily inserted into the entrance portion 1223a. The design of the limiting hole 1223 and the fixing protrusion 212 can assist the positioning hole 1222 and the positioning protrusion 211 to fix the receiving case 1 to the bottom plate 21, so that the receiving case 1 is more stable on the bottom plate 21.

The positioning hole 1222 and the positioning protrusion 211 are further designed. When the user wants to mount the receiving case 1 on the bottom plate 21, the fixing protrusion 212 is located in the limiting hole 1223. The user moves the receiving case 1 in the mounting direction D1, so that the fixing protrusion 212 is moved from the entrance portion

1223a to the fixing portion 1223c (referring to FIG. 10B). Because the shrinking portion 1223b has the effect of preventing the fixing protrusion 212 from being moved back to the entrance portion 1223a, the receiving case 1 can be fixed to the bottom plate 21 without an external force. When the user wants to separate the receiving case 1 from the bottom plate 21, the user moves the receiving case 1 in a direction opposite to the mounting direction D1, so that the fixing protrusion 212 is moved from the fixing portion 1223c to the entrance portion 1223a (referring to FIG. 10A), and the receiving case 1 and the bottom plate 21 are in a separated state.

According to some embodiments, a height of a head of the fixing protrusion 212 in a vertical direction H is lower than that of a surface 124 of the second bottom wall 122. In this way, the user may mount the receiving case 1 on or remove the receiving case 1 from the bottom plate 21 without affecting or damaging batteries on the second base 12. According to an embodiment shown in FIG. 9, the fixing protrusion 212 is generally in a shape of "T", the head thereof includes a cap 212a, the cap 212a is fixed to a periphery of the limiting hole 1223 and abuts against the second bottom wall 122, and a height of the cap 212a in a vertical direction H is lower than that of a surface 124 of the second bottom wall 122.

Figure 11A:
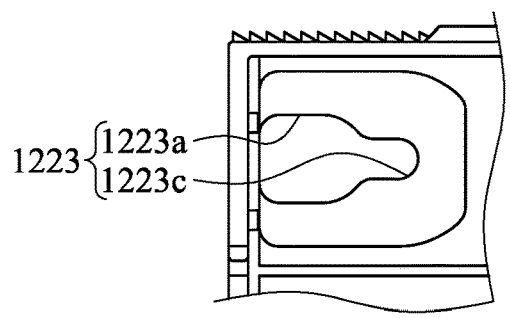
FIG. 11A and FIG. 11B respectively illustrate schematic diagrams of an elastic limiting hole according to an embodiment of the present disclosure.
Figure 11B:
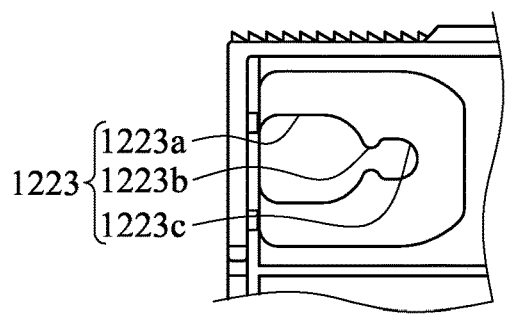

FIG. 11A and FIG. 11B respectively illustrate schematic diagrams of a limiting hole 1223 according to an embodiment of the present disclosure. There are no assisted openings 1224 on two sides of the limiting hole 1223. In an embodiment shown in FIG. 11A, the limiting hole 1223 only includes an entrance portion 1223a and a fixing portion 1223c. According to another embodiment shown in FIG. 11B, only the entrance portion 1223a, the shrinking portion 1223b, and the fixing portion 1223c are included. Both the limiting holes 1223 and the corresponding fixing protrusions 212 can assist the receiving case 1 to be fixed to the bottom plate 21 of the casing.

According to the receiving case of some embodiments, because there is a plurality of positioning positions between the multi-segment positioning portion and the multi-segment alignment portion, and the multi-segment positioning portion and the multi-segment alignment portion are positioned at one of the plurality of positioning positions, an adjustable accommodating space is formed between the first base and the second base to configure different sizes or different quantities of electronic elements as required. According to some embodiments, the cover of the receiving case is pivotally connected to the first base, and a structure of the engaging portion of the cover and the butting portion of the first base is designed, so that a user can easily operate to open and close the cover. According to some embodiments, there is a plurality of electronic elements in the receiving case, the engaging portion of the cover is an engaging groove, the engaging groove includes an insert groove and a guide groove, the guide groove includes a plurality of fixing positions for the engaging protrusion to position, and the shaft hole is a long hole. In this way, the user can adjust a position of the cover, so that the cover further covers the electronic elements in the accommodating space.

According to some embodiments, the chassis includes a receiving case. By disposing a positioning hole and an elastic limiting hole in the second base, and disposing a positioning protrusion and a fixing protrusion on the bottom plate of the housing, it is easier to remove the receiving case from and mount the receiving case on the bottom plate of the housing. In some embodiments, because the heights of the head of the fixing protrusion and the top end of the positioning protrusion in the vertical direction are lower than that of the surface of the second bottom wall of the second base, the user may remove or mount the receiving case in the casing without affecting or damaging batteries in the receiving case.

What is claimed is:

1. A receiving case, comprising:
    a first base, comprising two first side walls disposed in an opposite manner and two butting portions, wherein one of the two first side walls comprises a first sliding portion, one of the two first side walls comprises a multi-segment positioning portion, and each of the butting portions is extended outward from one of the side walls;
    a second base, comprising two second side walls disposed in an opposite manner, wherein one of the two second side walls comprises a second sliding portion, and one of the two second side walls comprises a multi-segment alignment portion; and
    a cover, comprising two engaging portions, wherein each of the butting portions is engaged with one of the engaging portions, so that the cover rotatably covers the first base wherein
    the first sliding portion is connected to the second sliding portion, and the multi-segment positioning portion of the first base is adapted to be engaged with the multi-segment alignment portion of the second base, so that the second base is slidably disposed on the first base.

2. The receiving case according to claim 1, wherein the first sliding portion is a sliding groove, and the second sliding portion is a slide rail.

3. The receiving case according to claim 1, wherein the multi-segment positioning portion is a rack, and the multi-segment alignment portion is a fixer.

4. The receiving case according to claim 1, wherein the first base further comprises a first bottom wall, opposite two sides of the first bottom wall are respectively connected to the two first side walls, and the first bottom wall comprises an abutting portion, the second base further comprises a second bottom wall, opposite two sides of the second bottom wall are respectively connected to the two second side walls, and the second bottom wall comprises a limiting opening, and the abutting portion is adapted to abut against the limiting opening.

5. The receiving case according to claim 1, wherein each of the engaging portions is an engaging groove, and each of the butting portions is an engaging protrusion, and the cover is pivotally connected to a shaft portion of the first base with a shaft hole.

6. The receiving case according to claim 5, wherein the shaft hole is an elongated hole, and the engaging groove comprises an insert groove and a guide groove, the insert groove is in combination with the guide groove, the guide groove comprises a multi-segment positioning structure with a plurality of fixing positions, and the guide groove is adapted to position the engaging protrusion at one of the plurality of fixing positions.

7. The receiving case according to claim 1, wherein
    the first sliding portion is a sliding groove, and the second sliding portion is a slide rail,
    the multi-segment positioning portion is a rack, and the multi-segment alignment portion is a fixer,
    the first base further comprises a first bottom wall, opposite two sides of the first bottom wall are respectively connected to the two first side walls, and the first bottom wall comprises an abutting portion, the second base further comprises a second bottom wall, opposite two sides of the second bottom wall are respectively connected to the two second side walls, and the second bottom wall comprises a limiting opening, and the abutting portion is adapted to abut against the limiting opening, each of the engaging portions is an engaging groove, and each of the butting portions is an engaging protrusion, the cover is pivotally connected to a shaft portion of the first base with a shaft hole, and the shaft hole is an elongated hole, and the engaging groove comprises an insert groove and a guide groove, the insert groove is in combination with the guide groove, the guide groove comprises a multi-segment positioning structure with a plurality of fixing positions, and the guide groove is adapted to position the engaging protrusion at one of the plurality of fixing positions.

8. A chassis, comprising:
a housing, comprising a bottom plate; and
a receiving case, disposed on the bottom plate, and comprising:
a first base, comprising two first side walls disposed in an opposite manner and two butting portions, wherein one of the two first side walls comprises a first sliding portion, one of the two first side walls comprises a multi-segment positioning portion, and each of the butting portions is extended outward from one of the side walls;
a second base, comprising two second side walls disposed in an opposite manner, wherein one of the two second side walls comprises a second sliding portion, and one of the two second side walls comprises a multi-segment alignment portion; and
a cover, comprising two engaging portions, wherein each of the butting portions is engaged with one of the engaging portions, so that the cover rotatably covers the first base, wherein
the first sliding portion is connected to the second sliding portion, and the multi-segment positioning portion of the first base is adapted to be engaged with the multi-segment alignment portion of the second base, so that the second base is slidably disposed on the first base.

9. The chassis according to claim 8, wherein the bottom plate comprises a positioning protrusion, and the second base further comprises a second bottom wall, opposite two sides of the second bottom wall are respectively connected to the two second side walls, the second bottom wall comprises at least one positioning hole, the positioning protrusion is located in the positioning hole, and a height of a top end of the positioning protrusion in a vertical direction is lower than that of a surface of the second bottom wall.

10. The chassis according to claim 9, wherein the at least one positioning hole sequentially comprises an entry portion, a guide portion, and a positioning portion, a width of the guide portion is less than widths of the entry portion and the positioning portion, the positioning protrusion is moved between the entry portion and the positioning portion, and a size of a hole of the entry portion is greater than that of a top of the positioning protrusion.

11. The chassis according to claim 9, wherein the bottom plate further comprises two fixing protrusions respectively located on two sides of the positioning protrusion, and the second bottom wall comprises two limiting holes corresponding to the two fixing protrusions, the two fixing protrusions are located in the two limiting holes, and a height of a top end of each of the two fixing protrusions in a vertical direction is lower than that of a surface of the second bottom wall.

12. The chassis according to claim 11, wherein each of the two limiting holes sequentially comprises an entrance portion, a shrinking portion, and a fixing portion, a width of the shrinking portion is less than widths of the entrance portion and the fixing portion, the each of the two fixing protrusions is moved between the entrance portion and the fixing portion, and a size of a hole of the entrance portion is greater than that of a head of the fixing protrusion.

13. The chassis according to claim 8, wherein the first sliding portion is a sliding groove, and the second sliding portion is a slide rail.

14. The chassis according to claim 8, wherein the multi-segment positioning portion is a rack, and the multi-segment alignment portion is a fixer.

15. The chassis according to claim 8, wherein the first base further comprises a first bottom wall, opposite two sides of the first bottom wall are respectively connected to the two first side walls, and the first bottom wall comprises an abutting portion, the second bottom wall comprises a limiting opening, and the abutting portion is configured to abut against the limiting opening.

16. The chassis according to claim 8, wherein each of the engaging portions is an engaging groove, and each of the butting portions is an engaging protrusion, and the cover is pivotally connected to a shaft portion of the first base with a shaft hole.

17. The chassis according to claim 16, wherein the shaft hole is an elongated hole, and the engaging groove comprises an insert groove and a guide groove, the insert groove is in combination with the guide groove, the guide groove comprises a multi-segment positioning structure with a plurality of fixing positions, and the guide groove is adapted to position the engaging protrusion at one of the plurality of fixing positions.

18. The chassis according to claim 8, wherein
the bottom plate comprises a positioning protrusion, the second base further comprises a second bottom wall, opposite two sides of the second bottom wall are respectively connected to the two second side walls, the second bottom wall comprises at least one positioning hole, the positioning protrusion is located in the positioning hole, and a height of a top end of the positioning protrusion in a vertical direction is lower than that of a surface of the second bottom wall,
the at least one positioning hole sequentially comprises an entry portion, a guide portion, and a positioning portion, a width of the guide portion is less than widths of the entry portion and the positioning portion, the positioning protrusion is moved between the entry portion and the positioning portion, and a size of a hole of the entry portion is greater than that of a top of the positioning protrusion,
the first sliding portion is a sliding groove, and the second sliding portion is a slide rail,
the multi-segment positioning portion is a rack, and the multi-segment alignment portion is a fixer,
the first base further comprises a first bottom wall, opposite two sides of the first bottom wall are respectively connected to the two first side walls, and the first bottom wall comprises an abutting portion, the second bottom wall comprises a limiting opening, and the abutting portion is configured to abut against the limiting opening, each of the engaging portions is an engaging groove, and each of the butting portions is an engaging protrusion, the cover is pivotally connected to a shaft portion of the first base with a shaft hole, the shaft hole is an elongated hole, and the engaging groove comprises an insert groove and a guide groove, the insert groove is in combination with the guide groove, the guide groove comprises a multi-segment positioning structure with a plurality of fixing positions, and the guide groove is adapted to position the engaging protrusion at one of the plurality of fixing positions, the bottom plate further comprises two fixing protrusions respectively located on two sides of the positioning protrusion, the second bottom wall comprises two limiting holes corresponding to the two fixing protrusions, the two fixing protrusions are located in the two limiting holes, and a height of a top end of each of the two fixing protrusions in a vertical direction is lower than that of a surface of the second bottom wall, and each of the two limiting holes sequentially comprises an entrance portion, a shrinking portion, and a fixing portion, a width of the shrinking portion is less than widths of the entrance portion and the fixing portion, the each of the two fixing protrusions is moved between the entrance portion and the fixing portion, and a size of a hole of the entrance portion is greater than that of a head of the fixing protrusion.

* * * * *